(No Model.)

O. R. OLSEN.
PULLEY.

No. 297,624. Patented Apr. 29, 1884.

WITNESSES,
Jacob W. Roeper
H. C. Allen

INVENTOR.
Olaf R. Olsen
By C. P. Jacobs
Atty.

UNITED STATES PATENT OFFICE.

OLAF R. OLSEN, OF INDIANAPOLIS, INDIANA, ASSIGNOR TO THE INDIANAPOLIS MACHINE AND BOLT WORKS, OF SAME PLACE.

PULLEY.

SPECIFICATION forming part of Letters Patent No. 297,624, dated April 29, 1884.

Application filed March 1, 1884. (No model.)

*To all whom it may concern:*

Be it known that I, OLAF R. OLSEN, a resident of Indianapolis, Marion county, Indiana, have made certain new and useful Improvements in Pulleys, a description of which is set forth in the following specification, reference being made to the accompanying drawings, in the several figures of which like letters indicate like parts.

My invention belongs to the class of metal pulleys with divisible rims, and will be understood from the following description.

Figure 1:
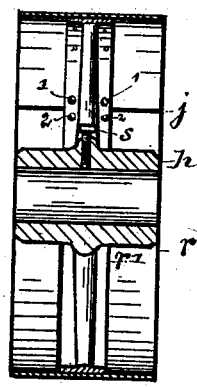
Figure 2:
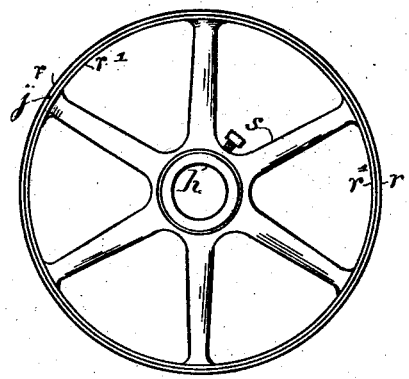
Figure 3:
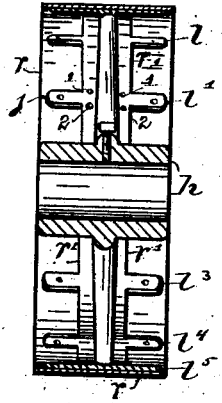
Figure 4:
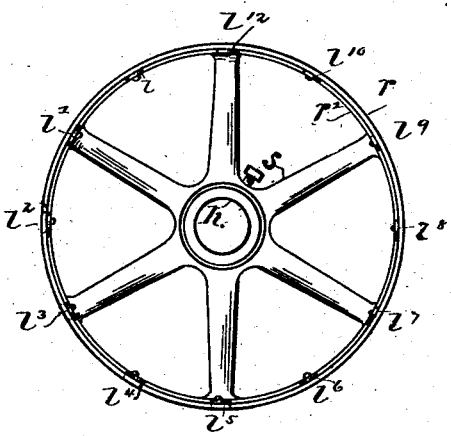

In the drawings, Figure 1 is a sectional view of my device. Fig. 2 is a side view of same. Fig. 3 is a sectional view, showing lugs on either side the inner rim for strengthening the pulley; and Fig. 4 is a side view of the same.

In detail, $r$ is the rim, made of rolled or sheet metal, preferably having a joint at $j$. The hub $h$, spokes $s$, and inner or secondary rim, $r'$, are all cast in one piece. This secondary rim may be made of any width desired, or may be cast with lugs or projections $l$ on the sides, as indicated in Fig. 3, insuring greater strength. In this way the joint in the outer rim may be re-enforced by placing one or more of these lugs on the inside of rim $r$ and over the joint. The lugs, being integral with the secondary rim $r'$, may readily be adapted to cover the joint or any other part of the outer rim, as will be seen. This secondary rim when properly placed and fitted is riveted to the outer rim by rivets 1 2. This form of construction insures a strong, simple, and light pulley capable of being run at high rates of speed. The hub and secondary rim may be made in two parts, if desired, and bolted together before being set into the outer rim.

What I claim, and desire to secure by Letters Patent, is the following:

1. The outer rim, $r$, in combination with the secondary rim $r'$, hub $h$, and spokes $s$, substantially as described.

2. A pulley composed of a jointed outer metal rim to which the hub and spokes are connected by means of a secondary inner rim, substantially as described.

In witness whereof I have hereto set my hand this 23d day of February, 1884.

OLAF R. OLSEN.

Witnesses:
C. P. JACOBS,
JACOB W. LOESSER.